US007006533B2

(12) United States Patent
Osborne (10) Patent No.: US 7,006,533 B2
(45) Date of Patent: Feb. 28, 2006

(54) METHOD AND APPARATUS FOR HUBLINK READ RETURN STREAMING

(75) Inventor: Randy B. Osborne, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 464 days.

(21) Appl. No.: 10/080,175

(22) Filed: Feb. 19, 2002

(65) Prior Publication Data

US 2003/0156581 A1 Aug. 21, 2003

(51) Int. Cl.
*H04L 12/00* (2006.01)
*H04J 3/16* (2006.01)

(52) U.S. Cl. .................. 370/474; 370/477; 710/313

(58) Field of Classification Search ........... 370/389, 370/393, 419, 471, 473, 474, 477; 710/34, 710/118, 313
See application file for complete search history.

(56) References Cited

U.S. PATENT DOCUMENTS

| | | | |
|---|---|---|---|
| 4,698,804 A | 10/1987 | Flores | |
| 5,991,304 A | 11/1999 | Abramson | |
| 6,145,039 A | 11/2000 | Ajanovic | |
| 6,272,563 B1 * | 8/2001 | Ajanovic et al. | ............. 710/29 |
| 6,298,409 B1 * | 10/2001 | Sheikh et al. | ............... 710/260 |
| 6,313,763 B1 | 11/2001 | Lambert | |
| 6,389,038 B1 * | 5/2002 | Goldberg et al. | ........... 370/471 |
| 6,438,123 B1 | 8/2002 | Chapman | |
| 6,496,895 B1 * | 12/2002 | Harriman et al. | ........... 710/306 |
| 6,516,375 B1 * | 2/2003 | Ajanovic et al. | ........... 710/305 |
| 6,594,722 B1 * | 7/2003 | Willke et al. | ................ 710/313 |
| 6,748,442 B1 * | 6/2004 | Keller | ........................ 709/232 |
| 2003/0002497 A1 * | 1/2003 | Vasudevan | .................. 370/389 |

FOREIGN PATENT DOCUMENTS

| | | |
|---|---|---|
| EP | 0855820 | 7/1998 |
| WO | WO 0044116 | 7/2000 |

OTHER PUBLICATIONS

International Search Report, International Application No. PCT/US 03/02827, European Patent Office, Oct. 2, 2003.

* cited by examiner

*Primary Examiner*—Hassan Kizou
*Assistant Examiner*—Ahmed Eallam
(74) *Attorney, Agent, or Firm*—Blakely, Sokoloff, Taylor & Zafman LLP (57) ABSTRACT

A device is presented including a a first hub. A bus is connected to the first hub. A second hub is connected to the bus. The first hub forms and transmits streaming packets including one packet header. Also presented is a system including a processor. A memory is connected to the processor. A first hub is connected to the processor. A second hub is connected to the first hub. Many peripheral components are connected to the second hub. The first hub forms and transmits streaming packets including one packet header.

16 Claims, 10 Drawing Sheets

| rq/cp | r/w | cr af | lk | Transaction Desc. Routing Field | Res | T.D. Attr. | Space | Data Length | Last DW BE / Special Cycle Encoding | 1st DW BE |
|---|---|---|---|---|---|---|---|---|---|---|

Bits: 31 30 29 28 27 26 25 24 23 22 21 20 19 18 17 16 15 14 13 12 11 10 9 8 7 6 5 4 3 2 1 0

FIG. 7
700

| rq/cp | r/w | | lk | Transaction Desc. Routing Field | Res | T.D. Attr. | Res. | Data Length | Completion Status |
|---|---|---|---|---|---|---|---|---|---|

Bits: 31 30 29 28 27 26 25 24 23 22 21 20 19 18 17 16 15 14 13 12 11 10 9 8 7 6 5 4 3 2 1 0

FIG. 8

| Encoding | Status |
|---|---|
| 0000 0000 | Successful Completion |
| 1000 0001 | Master Abort |
| 1000 0011 | Unimplemented Hub Link Special Cycle |
| 1000 0101 | Target Abort |

H1 = Header of read return for request 1
H1C = Header of continuation of packet 1. Addr and length modified from H1
H2 = header of read return for request 2

Dn-1, Dn, Dn+1, Dn+2 = Data

METHOD AND APPARATUS FOR HUBLINK READ RETURN STREAMING

BACKGROUND OF THE INVENTION

1. Field of the Invention

This invention relates to the field of computer systems, and more particularly to the field of communicating between devices in a computer system.

2. Description of the Related Art

Modern computer systems include a plurality of components, such as central processing units interconnected to system memory, a host bridge, peripheral components (e.g., keyboard, disk drive, mouse), external buses (e.g., a peripheral component interconnect (PCI) bus), etc. An interface, such as a hub link, transfers data between separate hubs within a computer system. A hub link is an interface for connecting building blocks of core logic via a narrow and high bandwidth interface. Packets are used for transmitting data between hubs via the hub link. With newer technology, such as PCI-X (PCI Local Bus Specification Rev. 3.0), transmission of packets between hubs over the hub link needs to be improved. With higher bandwidth technology, latency and overhead needs to be improved.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

The invention generally relates to a method and apparatus for improving bandwidth and reducing latency for data transfer over a hub link. Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a " or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention. Referring to the figures, exemplary embodiments of the invention will now be described. The exemplary embodiments are provided to illustrate the invention and should not be construed as limiting the scope of the invention.

Figure 1:
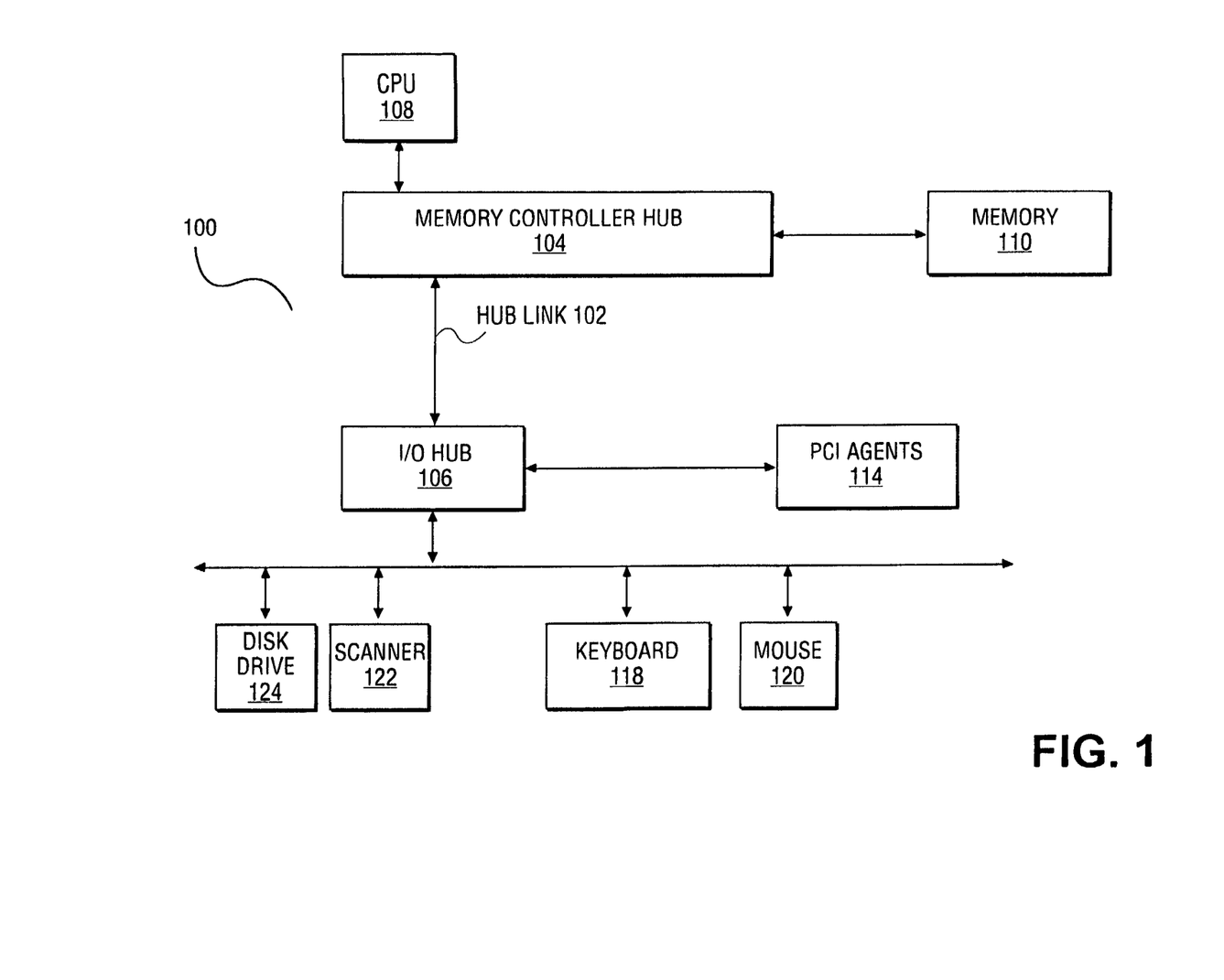
FIG. 1 illustrates a system including a hub link.

FIG. 1 illustrates system 100. System 100 comprises hub link 102, memory controller hub (MCH) 104, input/output (I/O) controller hub (ICH) 106, central processing unit (CPU) 108, memory 110, peripheral component interconnect (PCI) bus 112, PCI agents 114, keyboard 118, mouse 120, scanner 122, and disk drive 124. Hub link 102 provides individual components with a point-to-point interface. It should be noted, however, that hub link 102 may provide an interface between three or more components. As illustrated in FIG. 1, hub link 102 is used to interconnect two separate components (i.e., hub agents) within a chipset. The hub agents provide a central connection between two or more separate buses and/or other types of communication lines. ICH 106 provides an interconnection between various peripheral components within system 100 (e.g., keyboard 118, disk drive 124, scanner 122, and/or mouse 120). Moreover, the external buses and their agents (e.g., PCI bus 112 and PCI agents 114), interconnect directly with memory 110 and CPU 108 via hub link 102, by interconnecting with ICH 106, rather than interconnecting directly with MCH 104.

By using the hub link to interconnect MCH 104 and ICH 106, access is provided between I/O components and the CPU/memory sub-system. Transactions are transferred across hub link 102 using a packet based split-transaction protocol. For example, a request packet is used to start a transaction and a separate completion packet may subsequently be used to terminate a transaction, if necessary.

Figure 2:
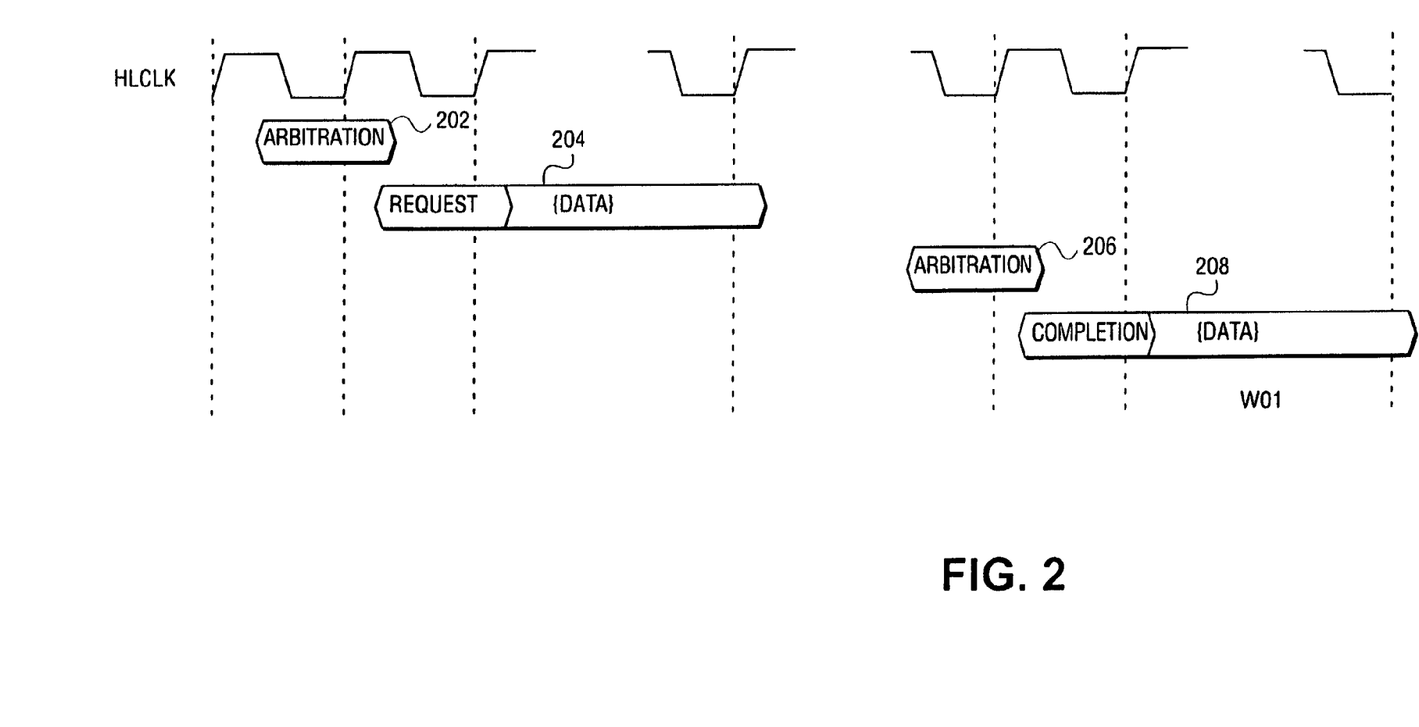
FIG. 2 illustrates an example of a split-transaction across a hub link.

FIG. 2 illustrates an example of a split-transaction across hub link 102. As illustrated in FIG. 2, a hub agent initially obtains ownership of hub link 102 via arbitration 202. Following the arbitration, there is a request phase 204. If necessary (e.g., in the case of returning data for a read transaction), completion phase 208 will follow the request phase. Prior to the completion phase, however, the responding hub agent will first arbitrate 206 for ownership of the hub link.

In between the time of transmitting a request packet and a corresponding completion packet across hub link 102, separate unrelated packets may be transmitted across the hub link in accordance with predetermined order rules, as discussed below in more detail. For example, in the case of a read request from a peripheral to memory, providing the requested data may take multiple clock cycles in order to have the data ready to be returned and a include a completion packet. During the time it takes to obtain the requested data, separate unrelated completion and/or request packets waiting in a queue/pipe of MCH 104, may be transmitted to ICH 106.

Furthermore, as illustrated in FIG. 2, each request or completion is transmitted as a packet across the interface. For write type transactions, data is associated with the request. For read type transactions, there will be data associated with the completion. In some cases, there will be more than one completion for a request in the case where the completion packet is disconnected, effectively splitting it into multiple completion packets.

Hub link 102 uses transaction descriptors for writing hub link traffic as well as identifying the attributes of a transaction. For instance, the descriptors may be used to define a transaction as isochronous or asynchronous, which, as a result, may then be handled in accordance with a predefined protocol.

Hub link 102 uses a packet-based protocol with two types of packets: request and completion. A request packet is used for each hub link transaction. Completion packets are used where required, for example, to return read data, or to acknowledge completion of certain types of write transactions (e.g., I/O write and memory write with requested completion). Completion packets are associated with their corresponding request packets by transaction descriptors in order.

The hub link interface uses an arbitration protocol that is symmetric and distributed. For example, each hub agent drives a request signal, which is observed by the other agent attached to the same interface. No grant signal is used, and agents determine ownership of the interface independently. The end of a packet transmission occurs when a hub link agent that "owns" the interface (e.g., is in the process of transmitting data), releases its control of the interface by de-asserting a request signal. In addition, flow control is also accomplished by using a "Stop" signal to retry or disconnect the packets.

Transfers of information across hub link 102 are accomplished using a packet-based protocol. A request packet is generally used to start a transaction and a completion packet is used to terminate the transaction. The hub link protocol also provides a transaction description mechanism to provide deterministic quality of service. This mechanism provides information used for writing of hub link traffic as well as identifying the attributes of a transaction, for example, by defining the transaction as isochronous or asynchronous.

Figure 3:
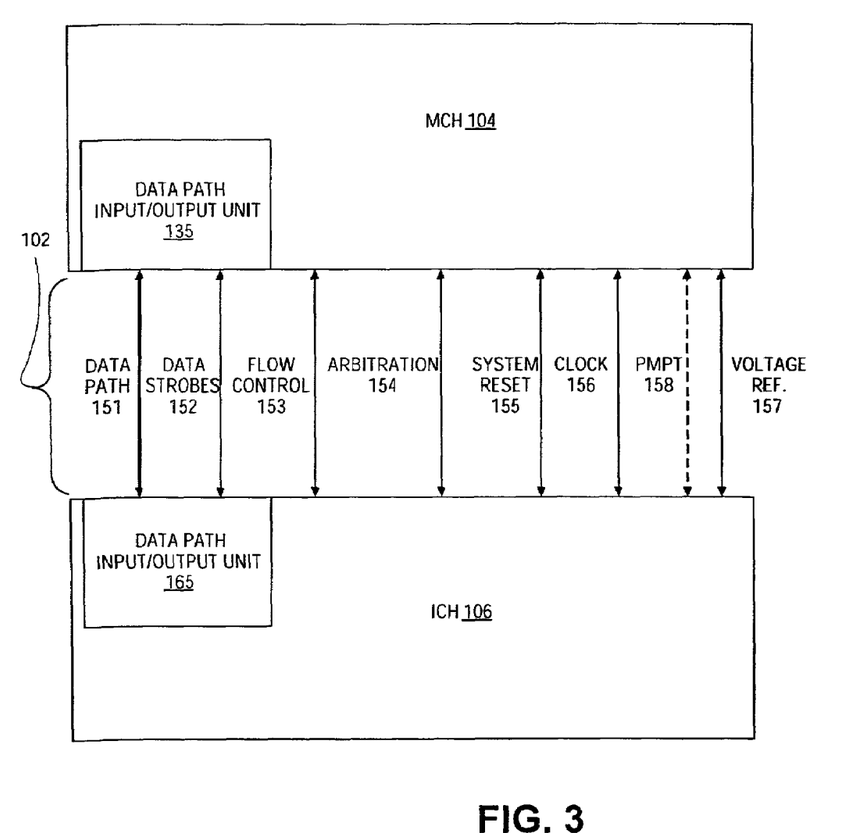
FIG. 3 illustrates a block diagram of a hub link.

FIG. 3 illustrates a block diagram of hub link 102 coupling MCH 104 and ICH 106. Hub link 102 includes bidirectional data path 151, one or more data strobes 152, flow control signal 153, group of arbitration signals 154, system reset signal 155, clock signal 156, voltage reference signal 157 and optional preemption (PMPT) signal 158. Hub A includes data path I/O unit 135, and hub B includes data path I/O unit 165. Both data path I/O units 135 and 165 interface to the data path 151. In general, hub link 102 is a mechanism for connecting main building blocks of the core logic of a computer system, such as system 100, via a relatively narrow and relatively high bandwidth data path 151. Between individual components in a computer system, such as between hub A and hub B, the connection is implemented in a point-to-point fashion.

Figure 4:
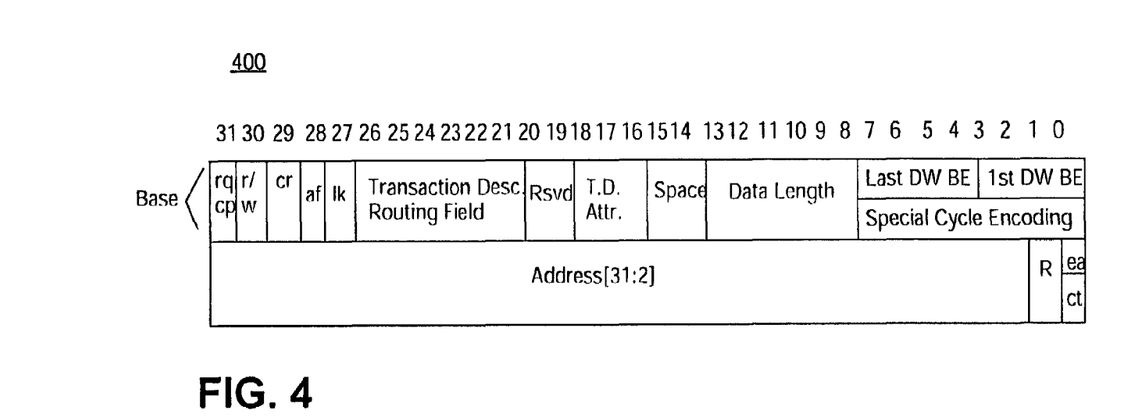
FIG. 4 illustrates a request packet header format including a 32 bit addressing mode.

FIG. 4 illustrates request packet header format 400 including a 32 bit addressing mode. The base portion of request packet header format 400 is one double word in length (one word equals 16 bits). An additional double word is required for a 64 bit addressing mode (illustrated in FIG. 5). Data is transferred across the interface in "little endian" order, i.e. the least significant byte first for an 8-bit wide data path 151 or a word for a 16-bit wide data path 151. The various fields of packet header 400 are described as follows.

The request/completion field (rq/cp) at bit 31 of the first double word indicates whether a packet is a request packet or a completion packet. Preferably, a "0" indicates a request packet and a "1" indicates a completion packet. Because packet header 400 is a request packet header, this field should be set to "0."

The read/write field (r/w) at bit 30 of the first double word indicates whether a packet is a read or a write transaction. The read/write field also indicates, along with the request/completion field, whether data will be included in the packet. For example, if the packet is a request and if a write is indicated, data will be included in the packet. Further, if the packet is a completion packet and if a read is indicated, data will be included in the packet. An indication of a request packet and an indication of a read signifies that no data will be included in the packet. Likewise, an indication of a completion packet and a write signifies that no data will be included in the packet. A read transaction is typically indicated by a "0," and a write transaction is typically indicated by a "1."

The completion required field (cr) at bit 29 of the first double word of request packet 400 indicates whether the initiator of the packet requires a response to the request packet. A completion required is typically indicated by a "1" and a no completion required is typically indicated by a "0." A write request packet header with the completion required bit set is issued when the initiator of the packet requires positive confirmation that the request has completed. The completion for the write should preferably not be returned until the write has reached its final destination. Memory, I/O, and configuration read request preferably should always set the completion required bit. The completion required bit preferably should be respected by the target for all requests, including special cycles, such as no operation (NOP), shutdown, Flush, Halt, synchronize (Sync), Flush acknowledge, Stop Grant Acknowledge, etc.

The address format (af) field located at bit 28 of the first double word indicates whether the addressing format is either implied or explicit (32 or 64 bit addressing). For header 400, the af bit would be set to "1" to indicate explicit addressing. For implied addressing, the af bit should be set to "0."

The lock (lk) field located at bit 27 of the first double word indicates whether or not the current packet is part of a locked sequence. All requests and completions in a locked sequence should have this bit set to "1." Agents that do not comprehend lock should ignore this field and should always fill this field with a "0."

The transaction descriptor routing field located at bits 26-21 of the first double word is a six-bit field used for packet routing. Other field widths are possible. Three bits are used for the hub identification (ID) which identifies the agent containing the initiating master for a transaction. The remaining three bits of the routing field are used to identify internal "pipes" within a hub link agent. This second three-bit sub-field is known as the pipe ID. The hub ID sub-field is used to support routing in a multiple hub link system (i.e., in the system that comprises of more than two hub link agents). Transactions coming from different hub link agents (enhanced, with different hub ID's) preferably should have no ordering requirements with respect to each other. Use of hub ID is optional for the hub link-based systems that do not support more than two hub link components and for particular hub link components that are not designed as hub link building blocks that can be used in larger configurations.

The pipe ID sub-field may be used to differentiate transactions only if the transactions have no ordering requirements with respect to each other. In other words, they are sourced from different internal pipes that carry un-ordered traffic. Bits 20 and 19 are reserved. The transaction descriptor attribute field (T.D.Attr.) located at bits 18-16 of the first double word is preferably a three-bit value which specifies how a transaction is to be handled when it is received by a target hub link agent, for example, whether the transaction is to be handled asynchronously or isochronously. The attribute field supports demanding application work loads which rely on the movement and processing of data with specific quality of service requirements or other differentiating characteristics. In addition, IEEE1394 (IEEE1394 standard (1394-1995 IEEE Standard for a High Performance Serial Bus-Firewire 1995) and USB (Universal Serial Bus) enable the isochronous movement of data between devices.

The space field located at bits 15 and 14 of the first double word indicate whether the packet has as a destination memory space ("00"), I/O ("01"), configuration space ("10"), or special cycles ("11").

The data length field located at bits 13–8 indicate the length of data (if any) to follow the packet. The data length is preferably given in double words, encoded such that the number of double words represented is 1 plus this number. Thus, "000000" represents one double word.

The last double word byte enable field (Last DW BE) located at bits 7-4 of the first double word indicates the byte enables for the last double word of data of any read or write request. The byte enables are active-low ("0"). If there is only one double word of data for request, this field must be inactive ("1111"). The byte enables may be discontiguous (e.g., "0101"). Byte enables are not meaningful for special cycles, and therefore Last DW BE field overlaps the special cycle including field.

The first double-word byte enable field (1$^{st}$ DW BE) located at bits 3-0 of the first double word indicates the byte enables for the first double word of data of any read or write request to memory, I/O, or configuration spaces. The byte enables are active-low ("0"). If there is only one double word of data for a request, this field preferably should be used. The byte enables may be discontiguous (e.g., "0101"). Byte enables are not meaningful for special cycles, and therefore the First and Last DW BE fields overlap the special cycle encoding field.

The special cycle encoding field located at 7-0 of the first double word encodes a special cycle type. This field overlaps the first and last double word byte enable fields.

The address [31:2] field located at bits 31-2 of the second double word indicates the entire address for 32 bit explicit addressing mode and provides the lower portion of an address for 64 bit explicit addressing mode.

The extended address field (ea) located at bit 0 of the second double word indicates 32 bit addressing ("0") or 64 bit addressing ("1"). This field is valid only for memory or special cycle requests only. This field is overlapped with the configuration type (ct) field.

The CT field located at bit 0 of the second double word is valid for configuration cycles only. This field indicates a type "0" configuration cycle if set to "0" and indicates a type "1" configuration cycle if set to "1." These configuration cycle types preferably correspond to PCI configuration cycle types.

Figure 5:
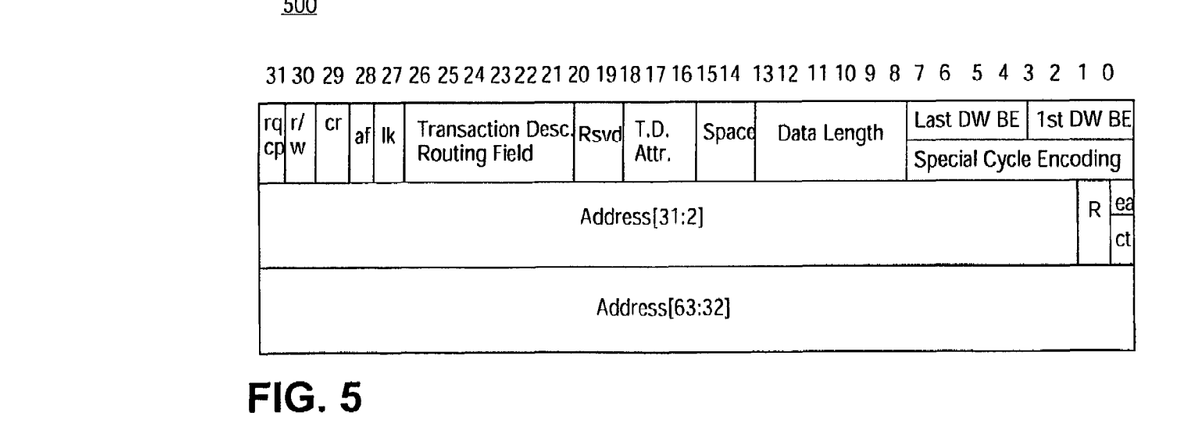
FIG. 5 illustrates a request packet header including a 64 bit addressing mode.

FIG. 5 illustrates a request packet header 500 including a 64 bit addressing mode. The fields for packet header 500 are identical to the fields shown in FIG. 4 with the addition of an address [63:32] field. The address [63:42] field contains the upper address bits for 64 bit addressing mode. For this mode, the ea field is set to "1" the address [63:32] field is included only for 64 bit addressing mode.

Figure 6:
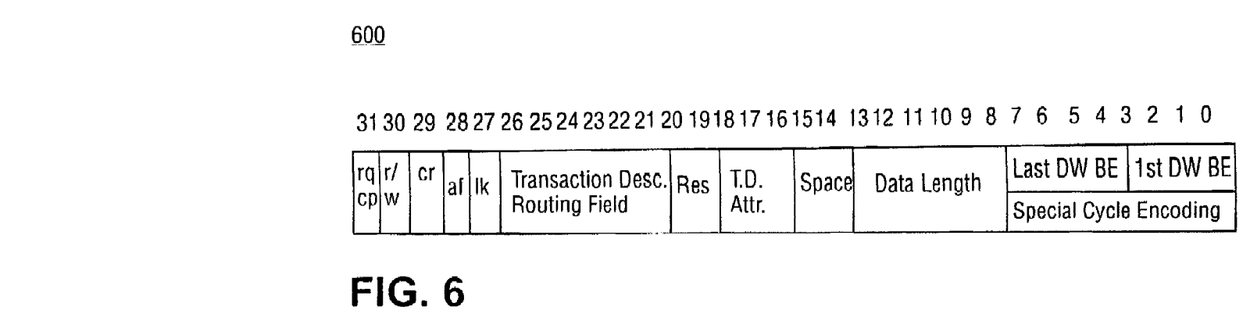
FIG. 6 illustrates a request packet header 600 including an implied addressing mode.

FIG. 6 illustrates a request packet header 600 including an implied addressing mode. The fields for packet header 600 are identical to the field shown in FIG. 5 with the exception of the absence of the second double word. The implied addressing mode is preferably applied to special cycles which do not include an address. The implied addressing mode may also be used for situations where the address can be discerned by context. When the implied mode is used, no address is sent for the request packet. The af field is set to "0" for implied addressing mode.

Figure 7:
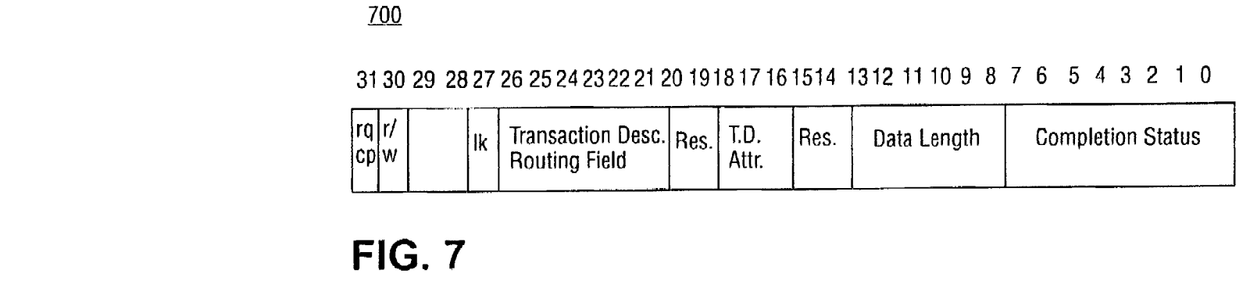
FIG. 7 illustrates a completion packet header.
Figure 8:
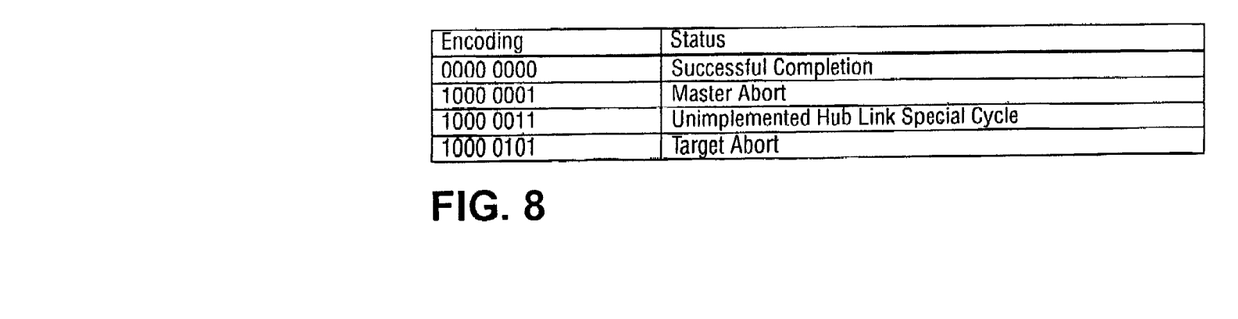
FIG. 8 illustrates a completion status and coding table.

FIG. 7 illustrates a completion packet header 700. The various fields are identical to those shown in connection with FIG. 6, with the exception of the absence of the completion required field, the address format field, and the space field. The byte enable field and the special cycle field are replaced with a completion status field. The completion status field is preferably loaded with a value from the completion status and coding table illustrated in FIG. 8.

Figure 9:
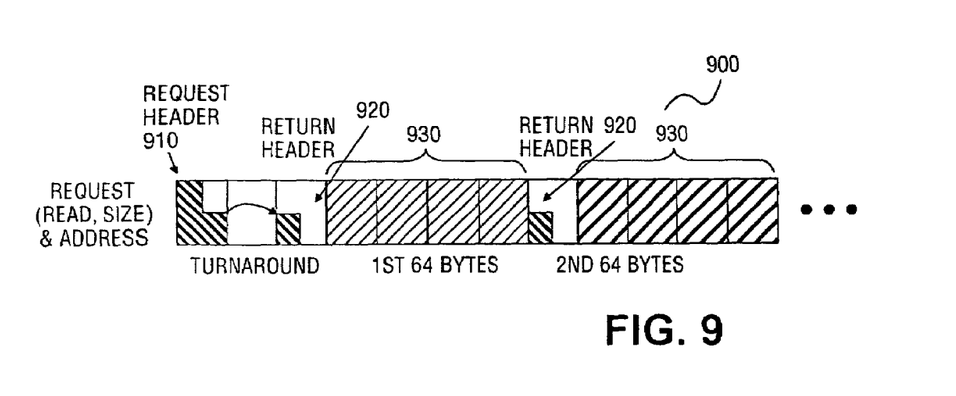
FIG. 9 illustrates read request and read return packet communication.

FIG. 9 illustrates how the prior art read request and read return packet communication works. As can be seen in FIG. 9, once the request header 910 is sent to a hub agent, there is a turn-around time of at least one clock before the read return is issued. The read return packet comprises of read return header 920 and data in 64 byte packets. Each request header 910 contains the starting address and the amount of data requested, among other information. For requests greater than 64 bytes of data, the read return is broken into packets with no more than 64 bytes of data per packet, which are each attached to a separate return header 920. The 64 byte data 930 is comprised of four 16-byte sections, where a section represents a clock cycle. The prior art transmission of a read request, the read return and the initial sending of the packet, results in overhead of one base clock for the read request and one base clock for turn-around and one base clock per each read return packet because of the read return header associated with each packet. There also may be a delay between the read request and the beginning of the read return due to the latency of processing the read request at the destination. For example, if a packet has a size of 64 bytes, a large read return, such as 512 bytes, will have at least three additional clocks of overhead due to each return header associated with the packets. Thus, the total possible bandwidth is reduced by the overhead contributed per read return packet (each having a read return header).

Since turn-around overhead is unavoidable for reads, if the maximum read request size is increased, overhead is reduced but latency is increased. If smaller request packets are used, latency is reduced, however, overhead is increased due to each read return header. One should note that bandwidth is a function of read request size and data return packet size. In one embodiment of the invention, data packets are streamed from the source onto the hub link without being buffered (unless unable to get the hub link grant). One complication of this embodiment of the invention is that not all of the data may be available at the time a request is initiated. If all the requested data is accumulated before initiating a reply, latency is added. To avoid the latency, packets are formed that can be transmitted as soon as data becomes available. In this scenario, latency can be decreased, but overhead is added, thus, reducing the maximum bandwidth.

Figure 10:
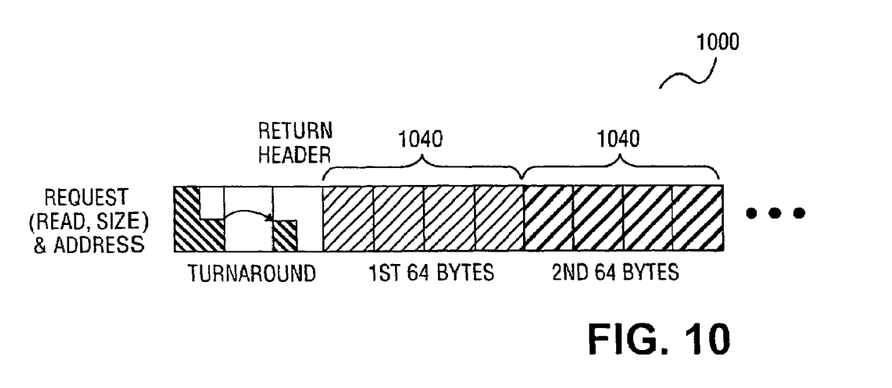
FIG. 10 illustrates an embodiment of the invention that structures streaming of read return data over a hub link.

In one embodiment of the invention, data path I/O unit 135 and data path I/O unit 165 include a mechanism for data streaming that structures streaming of read return data over a hub link. It should be noted that data path I/O unit 135 and data path I/O unit 165 can be incorporated in a chipset, or be incorporated in a separate circuit device. FIG. 10 illustrates an embodiment of the invention that structures streaming of read return data over a hub link. In this embodiment of the invention, return header overhead is reduced by streaming data packets 1040 back-to-back (concatenating) without attaching a return header to each data block, as opposed to the prior art approach that attaches a read return header to each packet.

Instead of fixing the read return packet size (e.g., 64 byte packets), an embodiment of the invention permits variable length packets. If the next data for the same stream arrives before the end of the previous data packet is sent out on the hub link, one embodiment of the invention continues the previous packet without a break, i.e., without a header. Therefore, no buffering is required to get more data. Since each return header uses one base clock of overhead, data can be returned in a minimum number of large packets, thus minimizing the number of completion headers.

In many instances, the entire read return can be transferred in a single packet with only one completion header. Data streaming also eliminates the latency increase associated with the target buffering read return data in order to form a sufficiently large hub link packet to amortize the completion header overhead satisfactorily. For example, it might cost three additional base clocks to collect three additional 64 byte cache lines to form a maximum sized 256 byte read return packet.

Data streaming, however, can present a problem of data exhaustion. This can occur since the target may, and in fact is encouraged to, initiate a read return packet before all the data has arrived at the hub link unit, e.g., from memory. In this case, it is possible that the next return data fails to arrive by the "just in time" deadline to follow the tail of the previous data right out on to the hub link.

In some embodiments of the invention, data path I/O unit 135 and data path I/O unit 165 include a means for packet-splitting over a hub link. In these embodiments of the invention, packet-splitting solves the case of data exhaustion. In these embodiments of the invention, upon data exhaustion occurring, the data packet is prematurely terminated at the point the data delivery deadline is violated. Upon further data arriving, another packet (a "successor" packet) is formed to continue the original transfer at the split point. This same packet splitting technique may also be employed to preempt a read return in the middle of a read return packet.

A packet is split if the transmitter of the packet disasserts its request prior to transmitting the last base clock of that packet as indicated by the request length in the pack header, or if a flow control event occurs which pertains to that packet. Packet splitting may occur for the following reasons. The first reason is data exhaustion. In this case, the transmitter has no further data immediately available for the packet. The second case is preemption. In this case, the receiving agent signals to the transmitter a desire to preempt, where upon the transmitter voluntarily withdraws its request. The transmitter can be preempted either by sampling the preemption signal (PMPT) asserted, or if the PMPT mechanism is not supported, then by a "gentleman's agreement" that the transmitter voluntarily withdraws its request when it samples the opposite agent's request that is asserted. This latter mechanism is optional and left up to the user. Third, if a "Stop" is asserted during data transfer, the transmitter may optionally split the packet. Normally the transmitter maintains its request and retransmits the "Stop-ed" data without forming a new packet, however, the transmitter may choose to release its request and re-arbitrate at another time at which point the transmitter will form a new packet with the remainder of the "Stop-ed" data. Therefore, a read request may be maintained when a "Stop" command is issued. In one embodiment of the invention, when the read request is deasserted, packet splitting occurs.

In some embodiments of the invention, in the case of packet splitting, the header will retain the amount of data remaining to be transmitted from the original packet. One should note that in another embodiment of the invention, data splitting occurs dynamically. Thus, in the case when data packets may not be split, large data packets are accompanied by a single header. In the case where data packets are split dynamically, upon resuming of data packet transmission, the header associated with the resumed data packet keeps track of the amount of data left to be transmitted based on what was already transmitted. Therefore, in the original packet, the total amount of data to be returned is included in the header.

Figure 11:
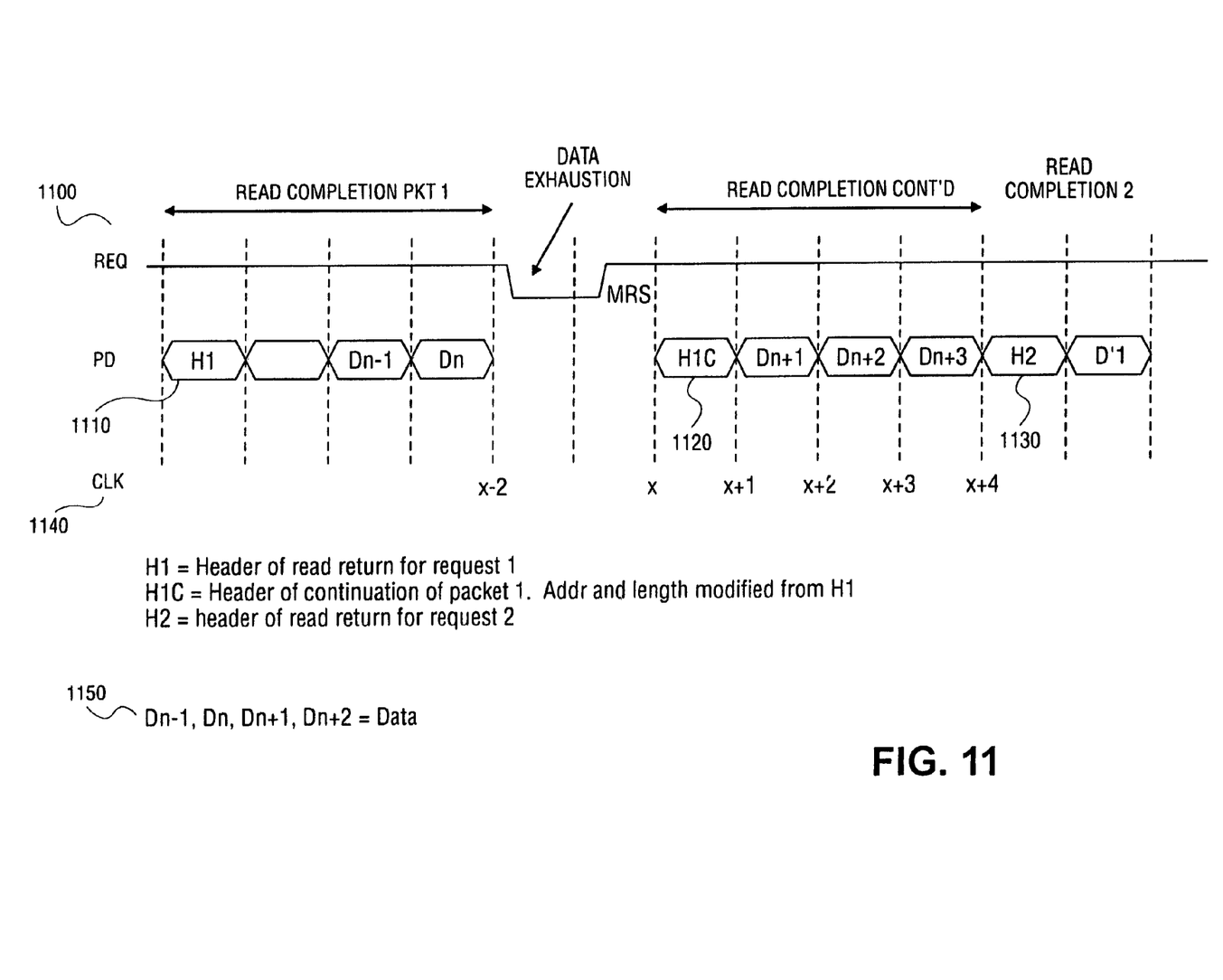
FIG. 11 illustrates a timing diagram for an embodiment of the invention.

FIG. 11 illustrates an example of a signal diagram for some embodiments of the invention. Header 1110 (H1) is the header for a first request (request 1). Header 1120 (H1c) is a header of the continuation packet 1. REQ is a request signal that is asserted/deasserted. CLK 1140 are various clocks for signal 1100. As illustrated in FIG. 11, the signal diagram is an example for read streaming with packet splitting due to data exhaustion. It can be seen that the read return (pckt 1) for a first request runs out of data at clock X−2. An agent deasserts its REQ signal upon data exhaustion. At clock X−1 (or any clock>X−1), the agent has collected enough data to resume streaming and asserts its REQ signal. In this example case, the agent gains control of the interface at clock X and resumes sending the return data at clock X+1 for the first read request. Header H1c contains the address for data Dn+1 and the length of the remaining data in the read return at the point when data exhaustion occurred (X−2).

Figure 12:
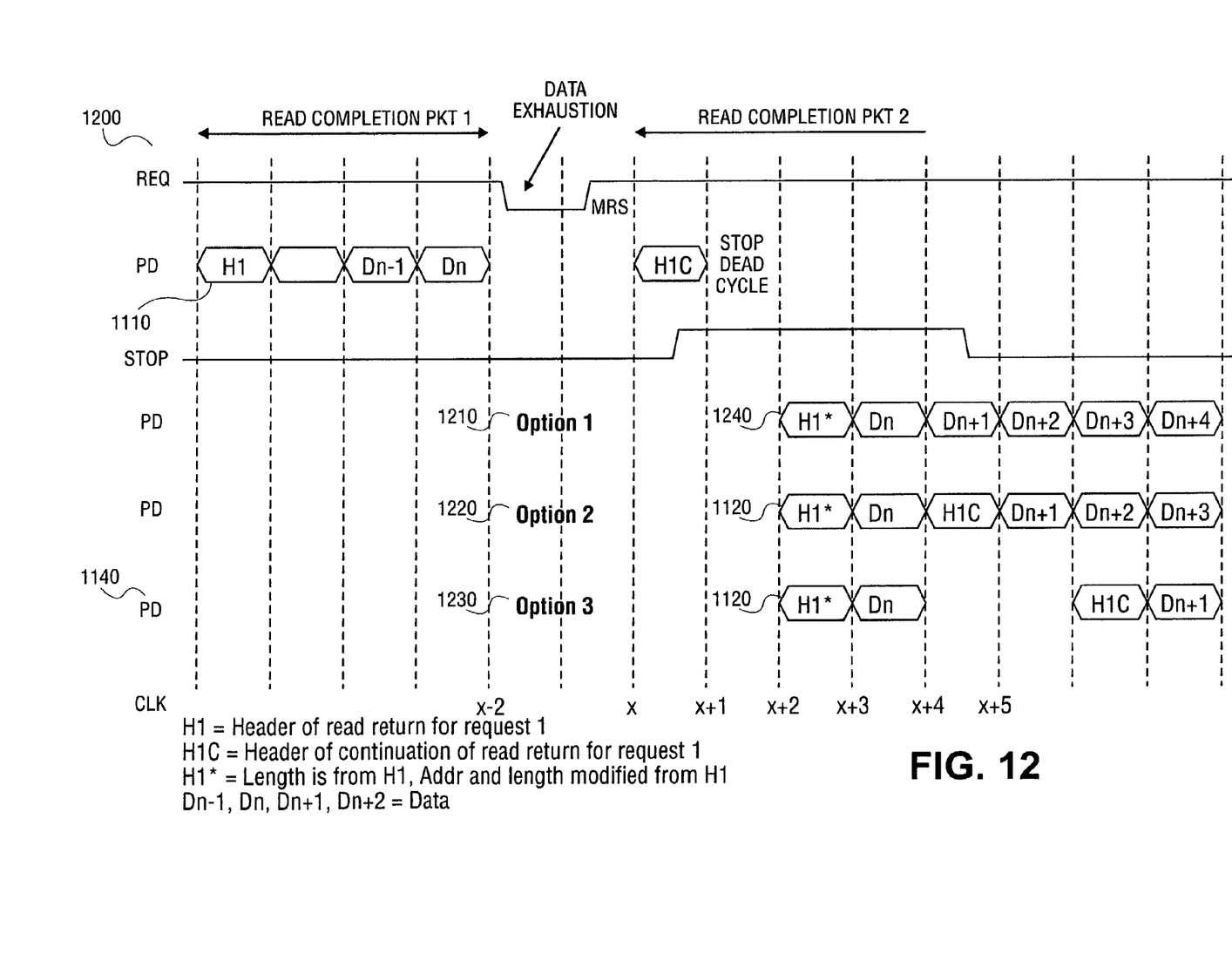
FIG. 12 illustrates a timing diagram for some embodiments of the invention.

FIG. 12 illustrates signal diagrams for some embodiments of the invention for continuation of streaming after a "STOP" flow control command following data exhaustion. Options 1210, 1220, and 1230 are presented for a further understanding of some embodiment's implementations for read return streaming. In signal diagram 1200, a target deasserts its REQ signal due to data exhaustion. Two clocks later, the target sends a new completion header to resume sending its read return packet, and then in the following clocks a STOP signal is asserted.

At clock X the target drives header H1c for the continuation read return packet. At clock X+1, the target asserts a STOP signal, indicating that the requester rejected the data Dn. The following options relate to how the target can respond to the STOP. In an embodiment implementing option 1 1210, a restart can occur at clock X+2 with header H1* and data payload Dn, Dn+1, Dn+2, . . . . Header H1* is header H1c with the address modified to begin at the address of Dn, and having the size increased for the length of Dn. In this embodiment, read return streaming is maintained.

In an embodiment implementing option 2 1220, a restart can occur at X+2 with header H1* and payload data Dn.

Header H1* is header H1 with a modified address beginning at Dn, and having the size modified to the length of Dn. Immediately following Dn, the streaming resumes with header H1c just as the target was attempting to do at clock X. In this embodiment, streaming does not resume until after header H1c.

In an embodiment implementing option 3 1230, a restart can occur at X+2 with header H1* and payload data Dn. In this embodiment, header H1* is header H1 modified with an address beginning at the address of Dn, and having the size modified to the length of Dn. After two clock cycles of idle (which correspond to 2 clocks between releasing data streaming and regaining data streaming at X), resuming with header H1c just as the target was attempting at clock X. Thus, read return data is not streamed from X+4 to X+6 and does not resume until after header H1c. This embodiment permits a simple implementation since there is no need to record that the asserted STOP signal is not relevant at X+4 and X+5.

Figure 13:
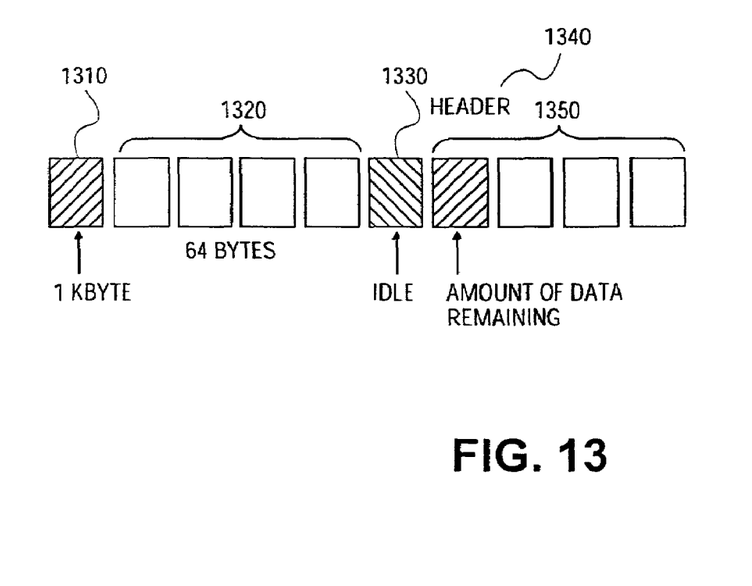
FIG. 13 illustrates an embodiment of the invention comprising a dynamically split data packet.

FIG. 13 illustrates an embodiment of the invention comprising a dynamically split data packet. As illustrated in FIG. 13, return header 1310 is followed by a data packet of an example amount of 64 bytes. Read return header 1310 includes the size of data to be returned (1 Kbyte in this example). In some embodiments of the invention, read return header 1310 is allowed to "lie" regarding the size of data to be returned. In these embodiments of the invention, the size specified in the return header is the amount of data to be returned, while in reality the packet can contain less than the size specified. In these embodiments of the invention, a target deasserts a request signal (illustrated in FIG. 11) before a streaming packet has completed transmission. An agent then sends the remaining portion of data requested in subsequent packets. The agent can send a reply packet before the agent has received all of the requested data. This allows latency to be reduced by not having to wait for the agent to accumulate all the data requested before the agent sends the reply.

Block 1330 illustrates one overhead clock segment of idle time. Return header 1340 includes the amount of data remaining to be transmitted. In the example illustrated in FIG. 13, this would be the amount included in return header 1310 minus the data following return header 1310, which is notated as 1320 (in this example, 64 bytes). It should be noted that the data packet following return header 1340, can be a large packet size, which benefits from data streaming.

Figure 14:
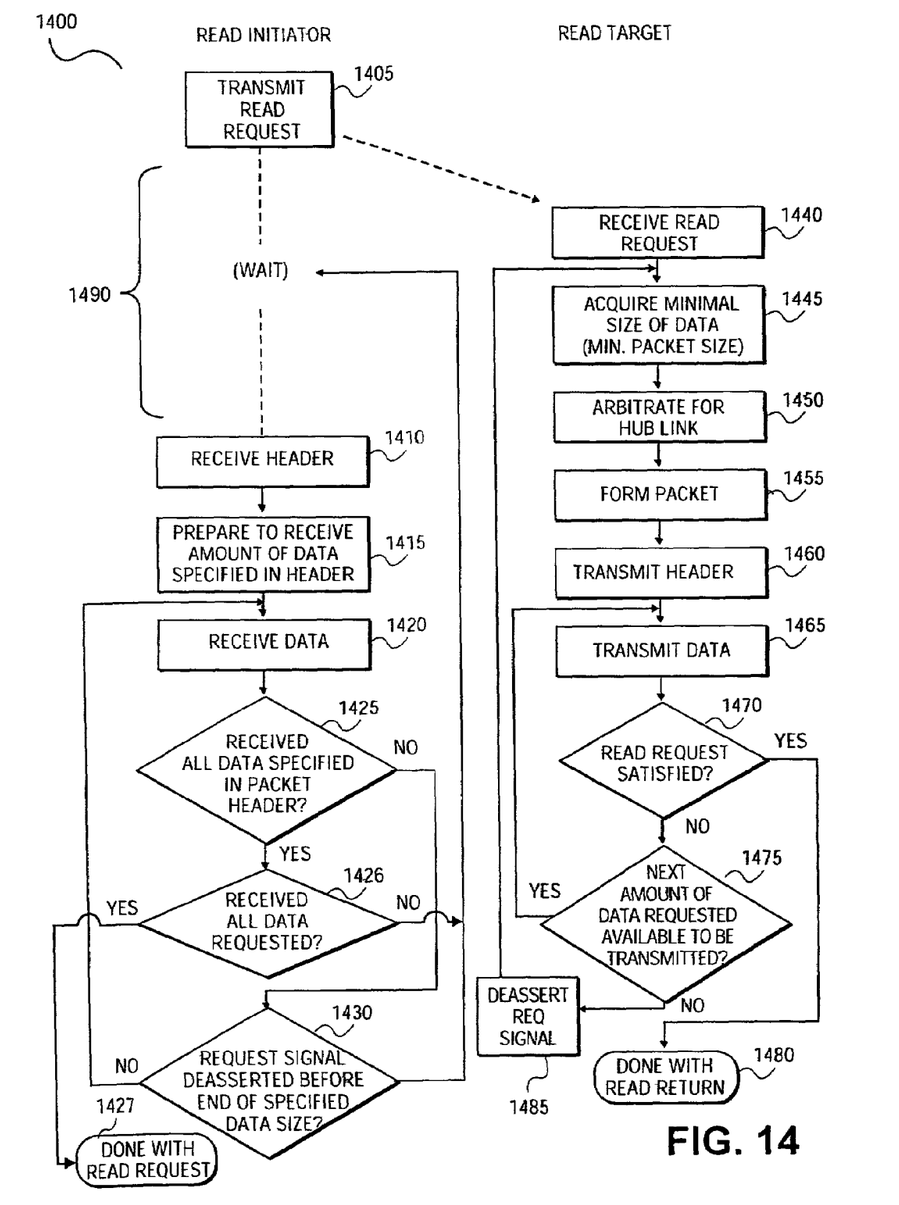
FIG. 14 illustrates a block diagram of a process for an embodiment of the invention.

FIG. 14 illustrates a block diagram of an embodiment of the invention. Process 1400 begins with block 1405, which sends a read request to the read target. The read target receives the read request at block 1440. Process 1400 continues with block 1445, which acquires a minimum amount of data before initiating a read return. Block 1450 arbitrates for the hub link. Block 1455 forms a packet. Block 1460 transmits a header. Block 1465 transmits the requested data.

Block 1470 determines whether the read request is satisfied or not. If the read request is satisfied, then the read target's process is done. If the read request is not satisfied, however, process 1400 continues with block 1475. Block 1475 determines whether the next amount of data requested is available to be transmitted. If block 1475 does determine that the next amount of data requested is available to be transmitted, process 1400 continues with block 1465. If block 1475 determines that the next amount of data requested is not available to be transmitted, process 1400 deasserts the request signal in block 1485 and continues with block 1445.

The read initiator receives the header transmitted from block 1460 at block 1410. Process 1400 continues with block 1415 where the read initiator prepares to receive the amount of data specified in the header previously received. Block 1420 receives the data packet. Block 1425 determines whether all the data specified in the packet header has been received or not. If block 1425 determines that all the data specified in the packet header has been received, process 1400 continues with block 1426. If the initiator has received all of the data requested, process 1400 terminates with block 1427. If the initiator did not receive all of the data requested, process 1400 continues with block 1490. If block 1425 determines that all the data specified in the packet header has not been received, block 1400 continues with block 1430.

Block 1430 determines whether a request signal has been de-asserted before the end of the specified data size. If block 1430 determines that the request signal has been de-asserted before the end of the specified data size, block 1400 continues with block 1490. If block 1430 determines that the request signal has not be de-asserted before the end of the specified data size, process 1400 continues with block 1420.

In some embodiments of the invention, process 1400 includes dynamic packet splitting. In these embodiments of the invention, if the target's request signal is deasserted before a streaming packet is completely received, a new packet is formed including a header and a data portion. The header contains the size of data remaining to be transmitted from the original streaming packet. In some cases, the split-packet can contain a fixed length data portion (e.g., 64 bytes). In other cases, the split-packet can be a streaming packet with the data portion containing the remaining data to be transmitted.

Besides being incorporated in a chipset, such as being included in data path I/O unit 135 and data path I/O unit 165, the above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.). The device or machine-readable medium may include a solid state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   a first hub;
   a bus coupled to the first hub; and
   a second hub coupled to the bus,
   wherein the first hub receives a plurality of packets each having a header and a data portion, splits the plurality of packets, forms and transmits streaming packets from the plurality of packets that are split, each streaming packet including only one header, splitting of the plurality of packets is dynamic, and the one header of each streaming packet includes remaining size of data left to be transmitted from its associated split packet, and a size of a data packet coupled to the one header of the streaming packet can differ from the size indicated in the one header.

2. The apparatus of claim 1, wherein the bus is a hub link.

3. The apparatus of claim 1, wherein the streaming packet is comprised of concatenated data packets, wherein the concatenated data packets are coupled to the one header.

4. The apparatus of claim 1, wherein the streaming packets have a variable length.

5. A system comprising:
a processor;
a memory coupled to the processor;
a first hub coupled to the processor;
a second hub coupled to the first hub;
a plurality of peripheral components coupled to the second hub;
wherein the first hub receives a plurality of packets each having a header and a data portion, splits the plurality of packets, forms and transmits streaming packets from the plurality of packets that are split, each streaming packet including only one header wherein the one header includes a remaining size of data left to be transmitted from its associated split packet, wherein a size of a data packet coupled to the one header can differ in size than size indicated in the one header.

6. The system of claim 5, wherein the bus is a hub link.

7. The system of claim 5, wherein the streaming packets are comprised of concatenated data packets.

8. The system of claim 5, wherein the streaming packets have a variable length.

9. A method comprising:
transmitting a first request;
receiving the first request;
forming a streaming packet;
transmitting the streaming packet;
receiving the streaming packet;
wherein the streaming packet comprises a single header and a plurality of concatenated data portions from a plurality of data packets that are split, where each of the plurality of data packets including a header portion and a data portion and the single header includes a remaining size of data left to be transmitted from its associated split packet.

10. The method of claim 9, wherein splitting of the plurality of data packets is dynamic.

11. The method of claim 9, wherein the streaming packet has a variable length.

12. The method of claim 9, further comprising:
removing a read request signal before all requested data is received;
sending subsequent packets after the request signal is removed, the subsequent packets including remaining requested data; and
sending a reply packet before all of the requested data is received.

13. An apparatus comprising a machine-readable medium containing instructions which, when executed by a machine, cause the machine to perform operations comprising:
transmitting a first request;
receiving the first request;
forming a streaming packet;
transmitting the streaming packet;
receiving the streaming packet;
wherein the streaming packet comprises a single header and a plurality of concatenated data portions from a plurality of data packets that are split, where each of the plurality of data packets include a header portion and the single header includes a remaining size of data left to be transmitted from its associated split packet.

14. The apparatus of claim 13, wherein splitting of the plurality of data packets is dynamic.

15. The apparatus of claim 13, wherein the streaming packet has a variable length.

16. The apparatus of claim 13, further containing instructions which, when executed by a machine, cause the machine to perform operations including:
removing a read request signal before all requested data is received;
sending subsequent packets after the request signal is removed, the subsequent packets including remaining requested data; and
sending a reply packet before all of the requested data is received.

* * * * *